Jan. 24, 1967  O. C. SCHERFEL  3,300,030
CONVEYOR BELT
Filed Feb. 16, 1965

INVENTOR.
OTTO CARL SCHERFEL
BY *Busser, Smith & Harding*
ATTORNEY.

3,300,030
CONVEYOR BELT
Otto Carl Scherfel, Philadelphia, Pa., assignor to Manganese Steel Forge Company, Philadelphia, Pa., a corporation of Pennsylvania
Filed Feb. 16, 1965, Ser. No. 432,976
5 Claims. (Cl. 198—193)

This invention relates to improvements in a conveyor belt and more particularly concerns a cord-type conveyor belt and a method of making it.

Conveyor belts are used to convey articles through a baking oven. In certain types of baking, it is necessary to use conveyor belts having a very tight mesh in order to properly support the articles to be baked. It has heretofore been suggested to provide a cord-type of belt having straight transversely disposed cross rods connecting the ends of the helical wires. Conveyor belts of this construction give the required tightness of mesh; however, they are subject to transverse play. Accordingly, when the belt is slack it may assume a relaxed position in which the cross rods are not in alignment. Then when tension is placed on the belt it may not snap into its proper position with all the cross rods aligned. This transverse play gives rise to tracking problems, and the belt may not track true over driving and idler pulleys and sheaves.

Some attempts have been made to eliminate the tracking problems caused by transverse play. One such attempt has been to use crimped cross rods to connect the helical wires together, instead of straight cross rods. When such a conveyor belt is placed in tension from a relaxed position, it snaps into shape with all cross rods aligned. However, a cord belt having crimped cross rods does not give as tight a mesh as desired to support articles such as crackers in a bake oven.

Another attempt to solve the tracking problem has been to provide tracking devices which are designed to guide the belt and help it track true. However, the belt itself has not been improved.

Accordingly, it is an object of this invention to provide an improved cord-type conveyor belt which has a very tight mesh and tracks true, and is not subject to objectionable transverse play when tensioned.

Other objects and advantages of this invention, including its simplicity and economy, will further become apparent hereinafter and in the drawings in which.

Figure 1:
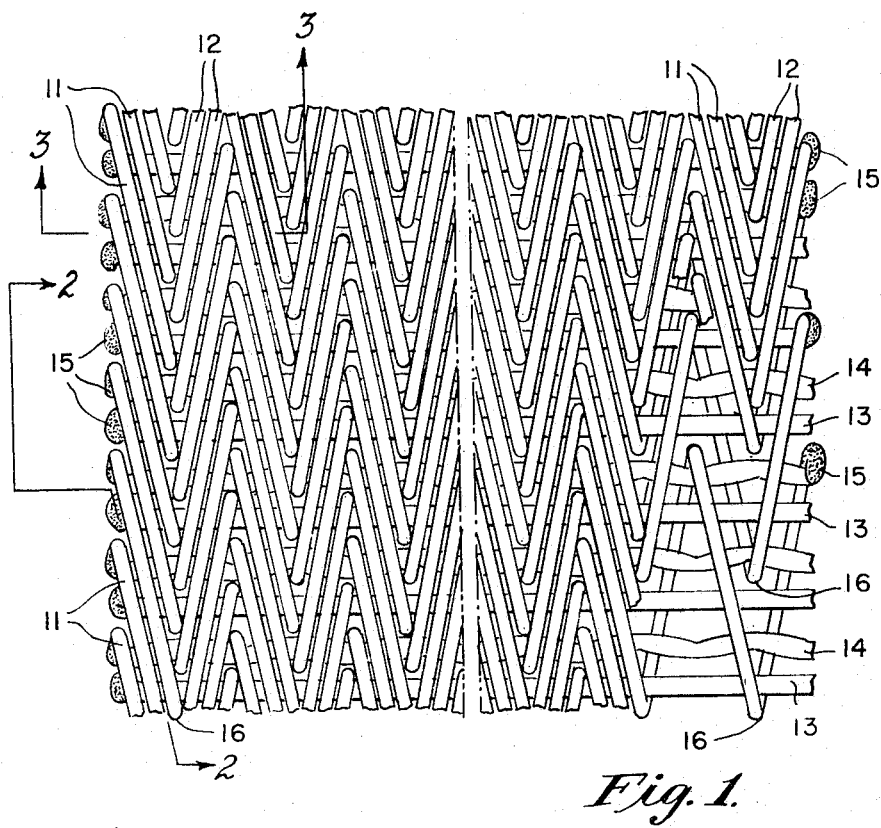
FIG. 1 is a plan view, partly broken away, of a cord-type conveyor belt constructed in accordance with this invention, with the belt being shown more open than in usual practice in order to better illustrate its construction.
Figure 2:
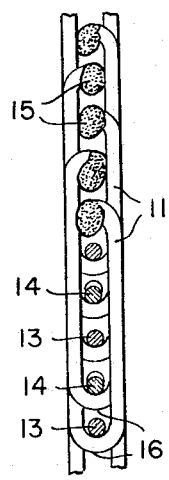
FIG. 2 is a view in section, taken as indicated by the lines and arrows 2—2 which appear in FIG. 1.
Figure 3:
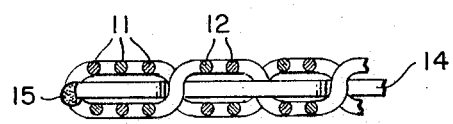
FIG. 3 is another view in section, taken as indicated by the lines and arrows 3—3 which appear in FIG. 1.

Turning now to the specific embodiment of the invention selected for illustration in the drawings, there is shown a cord-type conveyor belt comprising a plurality of helical wires 11 having a righthand twist, a plurality of helical wires 12 having a lefthand twist and being closely interspersed with the righthand twist wires 11 on parallel axes, a plurality of straight cross rods 13 extending along axes parallel to the axes of the helical wires 11 and 12, a plurality of crimped cross rods 14 extending along axes parallel to the axes of helical wires 11 and 12, and welds 15 securing the ends of each wire to the ends of one of the cross rods.

Straight cross rods 13 and crimped cross rods 14 are arranged in alternate fashion so that the rods are locked in place against lateral movement to thereby prevent side play of the conveyor belt.

Each of the helical wires 11 and 12 have spirals which are flattened so that each spiral has a pair of bights 16. Each wire 11 and 12 accommodates a plurality of cross rods 13 and 14 other than those directly engaged by bights 16 of their helices. The belt selected for illustration in the drawings is a six rod cord belt, because there are six cross rods positioned between the bights of each helix. One bight 16 of each pair contacts a straight cross rod 13 and the other bight 16 of the pair contacts a crimped cross rod 14. The number of cross rods between a pair of bights may vary in different belts, but an even number is preferred because such belts are better balanced than cord belts with an odd number of cross rods between a pair of bights.

Crimped cross rods 14 are made so as to have an undulating structure and comprise a series of crimps which are engaged by the bights 16 of the helices of wires 11 and 12.

In making the belt, a plurality of helically coiled wires 11 of righthand twist are assembled together with a plurality of helically coiled wires 12 of lefthand twist so that they lie closely interspersed in nested relation in alternate fashion. A series of crimped cross rods 14 are placed within the bights of alternate helically coiled wires. Then a series of straight cross rods 13 are inserted into the bights of the remaining coiled wires. The straight rods 13 lock the crimped rods 14 in place. The ends of the wires are then connected to the ends of the cross rods by welding.

The crimps of cross rods 14 are deep enough so as to assist in keeping the belt in alignment and prevent objectionable transverse play and tracking problems, yet not so deep as to make the mesh too open and unsuitable or undesirable for use of the belt in a baking oven.

In practice, it has been found that the desired result is obtained if the crimped rods 14 are placed in the helical wires 11 and 12 first, and then the straight rods 13 are inserted. The weave of the belt is so close that the crimped rods 14 cannot be inserted if the straight rods 13 are inserted first, at least not without a great deal of difficulty so as to be impractical for commercial assembly and production.

In operation, crimped rods 14 minimize or prevent side play of the belt, and the use of alternately positioned straight rods 13 provides for the desired tightness of mesh. In addition, the straight rods 13 provide a smoother surface for the belt than if all the rods were of the crimped type. This is an advantage since a flat surface is preferred for better quality of the baked product and better mechanical performance.

The belt of the present invention is also used to advantage in applications where the belt must follow a path which is curved transversely in the plane of the belt. Such belts are used, for example, in tunnels for freezing food packages wherein the belt is trained to bend around two stacks of horizontal sprockets placed at opposite ends of the freezing tunnel. The horizontal sprockets permit positioning the flights between sprockets closer together and thereby provide a longer ride for the food package in a smaller space than required for vertically disposed sprockets. Additionally, with vertical sprockets, the frozen food packages had to be dropped from one flight to the next, which would jumble the contents and could damage the package.

The inventive belt provides more square feed of freezer belt area in a smaller space, and permits the boxing of peas, for example, before freezing them.

Conventional flatwire belts adapted to follow a path which is substantially curved in the plane of belt travel are provided with slots that permit the concave edge of the belt to collapse as the belt rounds the curve so that the belt adjusts itself to follow the curved path. However, the cross rods of such belts develop a bow in making the curve with the outer end of the cross rods lagging behind, and this condition eventually causes the metal to fracture.

In the alternate crimped and straight cross rods belt of the present invention, the bights of the wires which engage a crimp of a crimped rod may stay in place when the belt is following a curved path in the plane of belt travel, while the bights of wires engaging a straight cross rod are free to slide laterally along the rod to relieve the pressure which might bow the rod. The inner ends of the rods collapse toward each other. When the curve is completed, the crimped cross rods snap the wires back into position so that the belt tracks true.

The balanced weave belt of the present invention lasts considerably longer than the flatwire belt having links which nest and prevent lateral sliding, because of the springy nature of the helical wires and because of the sliding action of the wires along the straight cross rods when rounding a turn.

It is to be understood that the form of the invention herewith shown and described is to be taken as a presently preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

The claimed invention:

1. A cord-type conveyor belt comprising a plurality of helical wires of righthand twist, a plurality of helical wires of lefthand twist closely interspersed with said righthand twist wires on parallel axes, a plurality of straight cross rods extending along axes parallel to the axes of the helical wires, a plurality of crimped cross rods extending along axes parallel to the axes of the helical wires, said straight and crimped cross rods being arranged in alternate fashion so that the rods are locked in place against lateral movement, and welds separately securing the ends of each wire to the ends of one of the cross rods.

2. The conveyor belt defined in claim 1, wherein said crimped cross rods have a series of crimps which are engaged by the bights of the helices of said wires and wherein single straight cross rods alternate with single crimped cross rods.

3. A cord-type conveyor belt comprising a plurality of helical wires of righthand twist, a plurality of helical wires of lefthand twist closely interspersed with said righthand twist wires on parallel axes, an even number of straight cross rods extending along axes parallel to the axis of the helical wires, an even number of crimped cross rods extending along axes parallel to the axes of the helical wires, said straight and crimped cross rods being arranged in alternate fashion so that the rods are locked in place against lateral movement, each helical wire having spirals which are flattened so that each spiral has a pair of bights, one bight of each pair contacting a straight cross rod and the other bight contacting a crimped cross rod, and welds separately securing the ends of each wire to the ends of one of the cross rods.

4. The cord-type conveyor belt defined in claim 3, wherein the number of cross rods between a pair of bights is six.

5. A method of making a cord-type conveyor belt comprising assembling a plurality of helically coiled wires of righthand twist with a plurality of helically coiled wires of lefthand twist so that they lie closely interspersed in nested relation in alternate fashion, placing a series of crimped cross rods within the bights of alternate helically coiled wires, then placing a series of straight cross rods within the bights of the remaining coiled wires, and separately connecting the ends of the wires to the ends of the cross rods.

References Cited by the Examiner

UNITED STATES PATENTS

| 2,147,328 | 2/1939 | Scherfel | 245—6 |
| 2,885,164 | 5/1959 | Hooper | 198—193 X |
| 3,202,387 | 8/1965 | Andrews et al. | 198—194 X |

FOREIGN PATENTS 642,661   6/1962   Canada.

EVON C. BLUNK, *Primary Examiner.*

R. E. KRISHER, *Assistant Examiner.*